Figure 1:
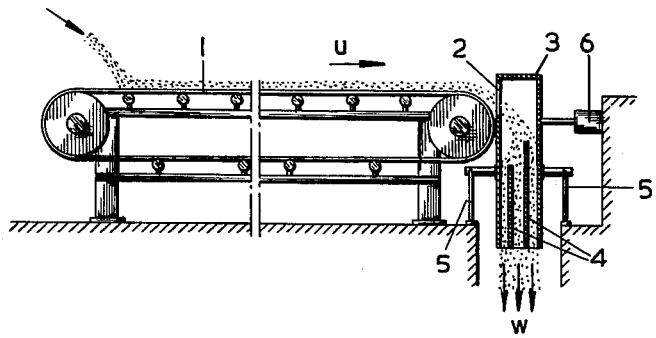

United States Patent [19]

Jonkers

[11] 4,063,456
[45] Dec. 20, 1977

[54] METHOD AND A DEVICE FOR CONTINUOUSLY MEASURING A FLOW OF MATERIAL

[76] Inventor: Cornelius Otto Jonkers, Morshoekweg 5, Hengelo (O), Netherlands

[21] Appl. No.: 502,079

[22] Filed: Aug. 30, 1974

[30] Foreign Application Priority Data

Sept. 3, 1973 Netherlands ............... 7312131

[51] Int. Cl.² ............................................. G01F 1/28
[52] U.S. Cl. ......................................................... 73/228
[58] Field of Search ................................. 73/228, 194

[56] References Cited

U.S. PATENT DOCUMENTS

| 2,033,306 | 3/1936 | Schofield | 73/228 |
| 3,206,978 | 9/1965 | Aronow | 73/228 |
| 3,429,181 | 2/1969 | Shiba | 73/228 |
| 3,611,803 | 10/1971 | Kajira | 73/228 |
| 3,613,449 | 11/1971 | Soejima | 73/228 |
| 3,640,135 | 2/1972 | Tomiyasu et al. | 73/228 |

FOREIGN PATENT DOCUMENTS

| 1,272,012 | 7/1968 | Germany | 73/228 |
| 1,001,828 | 1/1957 | Germany | 73/228 |

Primary Examiner—Harry N. Haroian
Attorney, Agent, or Firm—Fleit & Jacobson

[57] ABSTRACT

A device and a method for continuously measuring a flow of material in mass per unit time by measuring the momentum occurring by a change of movement of the material utilizing a conveyor to advance the material undergoing measurement at a speed having a known horizontal component. A catching box is movably mounted to serve as an impact device and presents a surface for receiving the material as it is discharged from the end of the conveyor. The discharged material exerts a horizontal force on the catching box which, in turn, causes the speed horizontal component of the material to be reduced to zero. The material is discharged from the catching box in a direction perpendicular to the direction of said speed horizontal component. A force measuring instrument is mounted between the catching box and a stationary support and serves to measure the horizontal force of momentum to which the catching box is subjected by the material impacting upon it.

10 Claims, 4 Drawing Figures

METHOD AND A DEVICE FOR CONTINUOUSLY MEASURING A FLOW OF MATERIAL

This invention relates to a method for continuously measuring a flow of material in mass per unit time by measuring the momentum occurring by a change of movement of the material, and to a device for realizing this method.

The present invention is especially intended for measuring a continuous flow of material, e.g. of bulk material, supplied by a belt conveyor, but is also applicable to discontinuous flows of material, e.g. flow of filled boxes or bags. Continuous measuring in this application means that also for discontinuous flows the measuring takes place always, which means at all moments or at least at those moments in which articles are conveyed.

A known method for continuously measuring flows of material operates with a so-called belt weighing device, In this case the material is conveyed by a conveyor belt and the vertical pressure or weight is measured, which is exerted by the belt downwardly on supporting rollers for the belt, and together therewith the belt speed is measured so as to be used for deriving the mass flow by multiplying said factors to obtain the mass of material conveyed per unit time. A disadvantage of this method is that not only the weight of the material but also the weight of the belt is measured. The belt will not have the same weight throughout, not only by non-uniform thickness, but also by material, which sticks to the belt locally. Thus this known method is not very accurate, and inaccuracies in measuring of 1 to 2% of the weight to be measured are normal.

A second method has been described in Netherlands patent application No. 70.15227. In this method it is not the vertical weight of the material which is measured, but the horizontal momentum which is necesary to accelerate the material to the conveying speed. In fact this method is based upon the second law of motion of Newton, which teaches that the rate of change of movement of a mass per unit time is proportional to the force which is exerted thereon in the direction of the change of movement. For a horizontal belt conveyor with a constant belt speed $u$, onto which the material is charged purely vertically, the said force exerted by the material not yet having the belt speed $u$ onto the belt is equal to the product of belt speed and mass of material discharged on the belt per unit time, or, in formula:

$$F = - u \, (dm/dt).$$

Thus, by measuring the force $F$ and the belt speed $u$ it is possible to determine the mass conveyed per unit time or the mass flow $dm/dt$, by dividing the measured F by $u$. In the said Netherlands patent application the measuring of the force F is realized bymounting the conveyor so as to be freely movable in a horizontal direction and to measure the horizontal fo rce which is exerted by the material falling onto the belt on this belt.

An advantage of this second method is that the weight of the belt does not play a role, so that a better accuracy is obtainable than in the known method as described before. A disadvantage is that the entire belt conveyor has to be mounted so as to be movable in a horizontal direction without friction to be able to measure the force F accurately, which is particular for large, wide and heavy conveyors makes them difficult to design and which also gives other disadvantages in practice, among others a high sensitivity to disturbances.

The present invention proposes, in the light of the above, also to use Newton's second law of motion, but in a different way. Thus the method as given in the preamble is according to the invention characterized in that the material is discharged from a supplying conveying device, of which the horizontal component $u$ of the conveying speed is known or is measured, onto or into impact with a surface which decreases said horizontal component of the speed to zero, and that the horizontal momentum on said impact surface is measured.

According to the same law the situation in this case is so that, if the horizontal component of speed $u$ is constant, the horizontal force F of momentum is equal to $u.dm/dt$, so that also in this case the mass flow $dm/dt$ is determined by the quotient of the two measured values F and $u$. However, the force F is now measured with the aid of the impact device, which is separate from the supplying conveying device and of which the dimensions may be small. The advantage thereof is that known and usual conveying devices may be used, so that no expensive changes in existing plants are necessary and that new plants according to the invention are not expensive. Moreover, by the small dimensions of the impact device, it is easy to protect it sufficiently against external influences.

As exclusively the force of momentum should be measured, which is exerted by the material onto the impact device, in which the weight of the device with the material therein does not and is not allowed to play a rôle, it is preferred to measure the force of momentum in a purely horizontal direction. As the force of momentum of the material which leaves the impact device may neither play a rôle, this material should leave said impact device in a direction perpendicular to the horizontal direction in which measuring takes place.

It will be clear from what has been said that the horizontal force F of momentum to be measured is proportional to the horizontal speed $u$, by which the material is fed to the device. If the real speed is not directed horizontally, but makes an angle to the horizontal direction, the speed $u$ to be used in the measurement should be the horizontal component of the speed vector, of which the other component is directed vertically.

Preferably the method according to the invention is further characterized in that the material is dumped from the supplying conveying device into a box, out of which the material is allowed to flow away perpendicularly to the horizontal component of the speed of supply thereto, which box is connected to the surrounding rigid structure by the intermediary of a force measuring device, which measures the force in the direction of said horizontal component of speed of supply.

In some cases another embodiment of the method of the invention is preferable, which is characterized in that the material is dumped from the supplying conveying device onto a moving conveyor, which has a direction of conveying which is perpendicular to the horizontal speed component of supply of the material thereto, and of which conveyor the horizontal force of momentum in the direction of said speed component of supply is measured. The supplying conveying device should have a known or easily measurable conveying speed and the material moving therewith should not have a difference in speed with respect to said device.

A device according to the invention is characterized in that it has a supplying conveying device for the material, an impact device to take up material dumped from said conveying device, said impact device having means to reduce the horizontal component of speed of the material in the direction of supply to zero, discharge means to discharge the material therefrom in a direction perpendicular to the direction of said horizontal speed component of supply, and means to measure the force of momentum, to which said impact device is subjected in the horizontal direction of supply by the change of movement of the material taken up thereby.

The invention will now be explained in more detail with reference to the enclosed drawings by way of example only.

FIG. 1 shows somewhat diagrammatically a preferred device according to the invention in a first embodiment.

Figure 2:
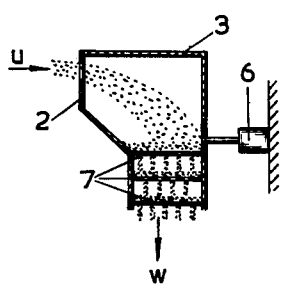

FIG. 2 gives a vertical section of a different embodiment of the impact device only of the device of FIG. 1.

Figure 3:
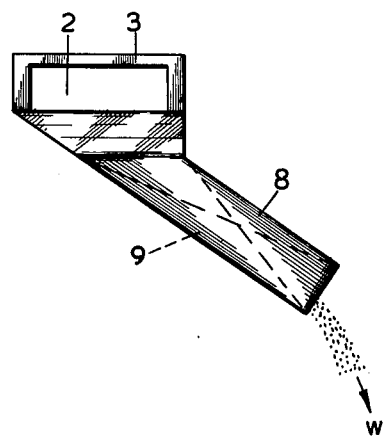

FIG. 3 gives a front view of such an impact device.

Figure 4:
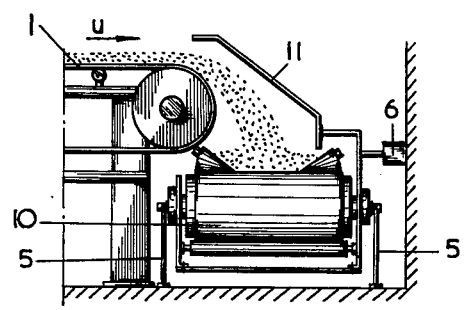

FIG. 4 gives another and often preferred embodiment of the most essential parts of the device according to the invention.

In FIG. 1 an embodiment of the device has been shown in combination with a horizontal belt conveyor 1, operating at constant belt speed $u$. At the end of this conveyor belt the material is dumped therefrom and thus makes a free fall under gravity. The vertical speed therewith increases proportional to time (neglecting the air resistance for such short distances) and the horizontal speed $u$ remains constant during the short path laid back by the material. Thus the material flows through the entry opening 2 of an impact catching box 3 of the device with said horizontal component of speed $u$. The material impacts onto the back wall of said box and jumps back, in part onto the front wall and the vertical guide baffles 4. The passages between said baffles and the walls are narrow and long, so that the parts of the material leave the device exactly with a speed which is perpendicular to the supply speed $u$. The box 3 is suspended on leaf springs 5, so that some movement of the box exclusively in the direction of the speed $u$ is possible, said springs also exerting a positive prestressing force between the box and the measuring device 6, by which the force of momentum is measured. By said prestressing force the box is always urged into and kept into contact with said measuring device. It will be clear that the force F of momentum of the material should be derived from the force as measured after subtracting said prestressing force. The material leaves the box 3 with the downwardly directed speed $w$, which is directed purely vertically downward and which, because it is accurately perpendicular to the horizontal direction in which the momentum of deceleration of the material is measured, has not the slightest disadvantageous effect on the accuracy of the result of the measurement.

In FIG. 2 a different possibility has been given. Instead of the baffles 4, which make the material flow out in a direction accurately perpendicular to the horizontal speed of input $u$, the box 3 with the entry opening 2 is in this case provided with sieve plates 7.

In FIG. 3 another embodiment of said impact catching box 3 has been shown. The material, which flows through the entry opening 2 into the box 3 with the horizontal component of speed $u$ perpendicular to the plane of the drawing, is discharged through a transversely directed closed discharge trough 8. In said trough there may be vertical baffles 9 to make certain that the material leaves the trough with a speed ($w$), which is accurately perpendicular to the horizontal speed $u$. The speed $w$ needs not be horizontal, if only it is perpendicular to the measured horizontal speed component $u$.

FIG. 4 gives another possibility to transmit the horizontal supply speed $u$ in the device into a speed of discharge which is perpendicular thereto. The material, which enters the device with the speed $u$ on a conveyor belt, falls onto the belt 10 of a belt conveyor, of which the conveying direction is perpendicular to the horizontal speed $u$ of the oncoming material. This conveyor 10 has here been shown as a belt conveyor, but it will be clear that it may also be a different type of conveyor, such as a conveyor with a vibrating trough, a sliding trough or the like, as the speed, with which this device conveys the material is as such not important and need not be measured. In this case the frame of the conveyor 10 is suspended on leaf springs 5 allowing some movement of the conveyor 10 in the direction of the speed $u$, the force F of the momentum being measured by a measuring device 6. To avoid material falling to the side of the conveyor 10 a baffle 11 has been provided.

Instead of leaf springs 5 there may be other means to mount the device for taking up the material flexibly in the horizontal direction of supply, such as by sliding rods, supporting rollers or supporting balls with suitable guides etc.

It will be clear that the amount of movement of the impact device for taking up the material needs only be very small, depending on the nature of the measuring device applied for measuring force F. It is possible to use electric measuring means, such a pressure boxes with straim gauges which only allow very slight displacements, but it is also possible to use mechanical or hydraulic measuring means, and all such means are known as such in many different embodiments.

The horizontal speed $u$ may immediately be derived from the data of the drive means for driving the supplying conveying means, or said speed may be measured in one of different ways well knownto the expert. If desired this measurement may be combined with automatic registering and integrating means and/or may be used for the automatic control of another parameter, such as the supply of the material onto said conveyor.

I claim:

1. A device for continuously measuring a flow of material in mass per unit time by measuring the momentum occurring by a change of movement of the material comprising, in combination, a conveying device for advancing the material at a speed having a known horizontal component, a movably mounted impact device having a surface for receiving material discharged from said conveying device in an impact direction such that the momentum of the material acting in the direction of said speed horizontal component exerts a horizontal force thereon, said impact device being arranged to reduce the speed horizontal component of the material in said impact direction to zero, discharge means for discharging the material from said impact device in a direction perpendicular to the direction of said speed horizontal component, a stationary support, and force measuring means mounted between said impact device and said stationary support for measuring said horizontal force of momentum to which said impact device is subjected by said material impacted thereon.

2. A device according to claim 1, wherein the impact device includes a catching box mounted movably with respect to the stationary support, and wherein said force measuring device is mounted between said box and said stationary support for measuring the force on the box in the direction of said horizontal component of speed.

3. A device according to claim 2, wherein said box is subdivided by upstanding baffles perpendicular to the horixzontal component of speed into compartments for transferring the material into discharging flows of material in a direction perpendicular to said horizontal component of speed.

4. A device according to claim 3, wherein the baffles terminate with their upper edges at different heights within the box.

5. A device according to claim 2, wherein one or more catching grids or sieve plates are mounted in said box one above the other.

6. A device according to claim 1, wherein said impact device comprises a conveyor moving perpendicular to said horizontal component of speed, means for supporting said conveyor movably with respect to said support structure, and wherein said conveyor is connected to said stationary support through said force measuring device.

7. A device according to claim 1, wherein the impact device is supported by supports movable in the direction of the force measurement.

8. A method for continuously measuring a flow of material in mass per unit time by measuring the momentum ocurring by a change of movement of the material comprising the steps of, discharging flowable material from a source of supply, advancing said discharged flowable material in a path at a speed having a known horizontal component, impacting said moving flowable material onto an impact surface in an impact direction such that the momentum of said impacting material exerts a horizontal force on said impct surface in the direction of said speed horizontal component, reducing the speed of the impacting material in the direction of said speed horizontal component to zero with said impact surface, moving said impacting material from said impact surface in a direction perpendicular to the direction of said speed horizontal component and measuring said horizontal force exerted on said impact surface by said impacting material.

9. A method according to claim 8, wherein said impact surface is provided on a box and wherein said impacting step is carried out by introducing said material into said box, and wherein said step of moving said material from said impact surface is carried out by causing the material to be discharged from the box in a direction perpendicular to said speed horizontal component and wherein said measuring step is carried out by measuring the force exerted on the box in the direction of said speed horizontal component.

10. A method according to claim 8, wherein said impacting step is carried out by moving said material onto a moving conveyor which has a conveying direction perpendicular to said speed horizontal component and wherein said measuring step is carried out by measuring the horizontal force of momentum on said conveyor in the direction of said speed horizontal component.

* * * * *